US012412478B1

(12) United States Patent
Cochran

(10) Patent No.: US 12,412,478 B1
(45) Date of Patent: Sep. 9, 2025

(54) EFFICIENT RASTER DATA RANGE QUERY FOR PLANNED UAV FLIGHT SEGMENTS

(71) Applicant: WING AVIATION LLC, Mountain View, CA (US)

(72) Inventor: Theran Cochran, Tucson, AZ (US)

(73) Assignee: Wing Aviation LLC, Palo Alto, CA (US)

( * ) Notice: Subject to any disclaimer, the term of this patent is extended or adjusted under 35 U.S.C. 154(b) by 152 days.

(21) Appl. No.: 18/397,720

(22) Filed: Dec. 27, 2023

(51) Int. Cl.

| | |
|---|---|
| ***G08G 5/34*** | (2025.01) |
| ***G08G 5/55*** | (2025.01) |
| ***G08G 5/57*** | (2025.01) |
| ***G08G 5/59*** | (2025.01) |
| ***G08G 5/74*** | (2025.01) |

(52) U.S. Cl.
CPC ................. *G08G 5/34* (2025.01); *G08G 5/55* (2025.01); *G08G 5/57* (2025.01); *G08G 5/59* (2025.01); *G08G 5/74* (2025.01)

(58) Field of Classification Search
CPC .. G08G 5/34; G08G 5/55; G08G 5/57; G08G 5/59; G08G 5/74
USPC ............................................................. 701/3
See application file for complete search history.

(56) References Cited

U.S. PATENT DOCUMENTS

| | | | | |
|---|---|---|---|---|
| 8,234,068 | B1 * | 7/2012 | Young | G08G 5/34 701/410 |
| 9,513,125 | B2 * | 12/2016 | Ravenscroft | G08G 5/57 |
| 9,965,964 | B2 * | 5/2018 | Bernhardt | G08G 5/55 |
| 11,648,360 | B2 * | 5/2023 | Studer | A61K 33/00 128/205.28 |
| 2021/0295715 | A1 * | 9/2021 | Gia | G05D 1/0646 |

OTHER PUBLICATIONS

S2Geometry, "S2 Cells," downloaded from <https://s2geometry.io/devguide/s2cell_hierarchy.html> Oct. 4, 2023, 19 pages.

* cited by examiner

*Primary Examiner* — Muhammad Shafi
(74) *Attorney, Agent, or Firm* — Christensen O'Connor Johnson Kindness PLLC

(57) ABSTRACT

A computer system obtains a raster cell of terrain data from a database, a query shape corresponding to a planned flight segment of a UAV that intersects with the raster cell, and a range of acceptable terrain elevation values for the planned flight segment. The raster cell comprises a minimum terrain elevation value, a maximum terrain elevation value, and links to sub-cells of the raster cell. The computer system determines whether the minimum and maximum terrain elevation values of the raster cell are within the range of acceptable terrain elevation values for the planned flight segment and validates the planned flight segment with respect to the raster cell based at least in part on whether the minimum and maximum terrain elevation values of the raster cell are within the range of acceptable terrain elevation values for the planned flight segment.

19 Claims, 8 Drawing Sheets

EFFICIENT RASTER DATA RANGE QUERY FOR PLANNED UAV FLIGHT SEGMENTS

TECHNICAL FIELD

This disclosure relates generally to autonomous vehicles, and in particular but not exclusively, relates to flight planning for unmanned aerial vehicles (UAVs).

BACKGROUND INFORMATION

As fleets of UAVs, also referred to as drones, are used for package deliveries, aerial photography, public safety, etc., careful flight planning is increasingly important. UAV operators must ensure that the aircraft fly within an acceptable range of altitudes. They must fly high enough above the ground that any obstacles are known and can be planned around, but low enough to avoid the airspace where manned aircraft fly.

One approach involves checking planned flights against terrain maps. Flight plans are typically encoded relative to sea level (e.g., for purposes of compatibility with global positioning system (GPS) and pressure altimeter instruments), rather than to local terrain, so avoiding collisions requires further computation.

One straightforward way to conduct such checks is to query all the terrain heights in the area corresponding to each flight segment and compare those with the planned flight altitude in the area. However, this process is inefficient and resource intensive, because it tends to require querying terrain data at fine levels of resolution, requiring a large amount of computation and data movement.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
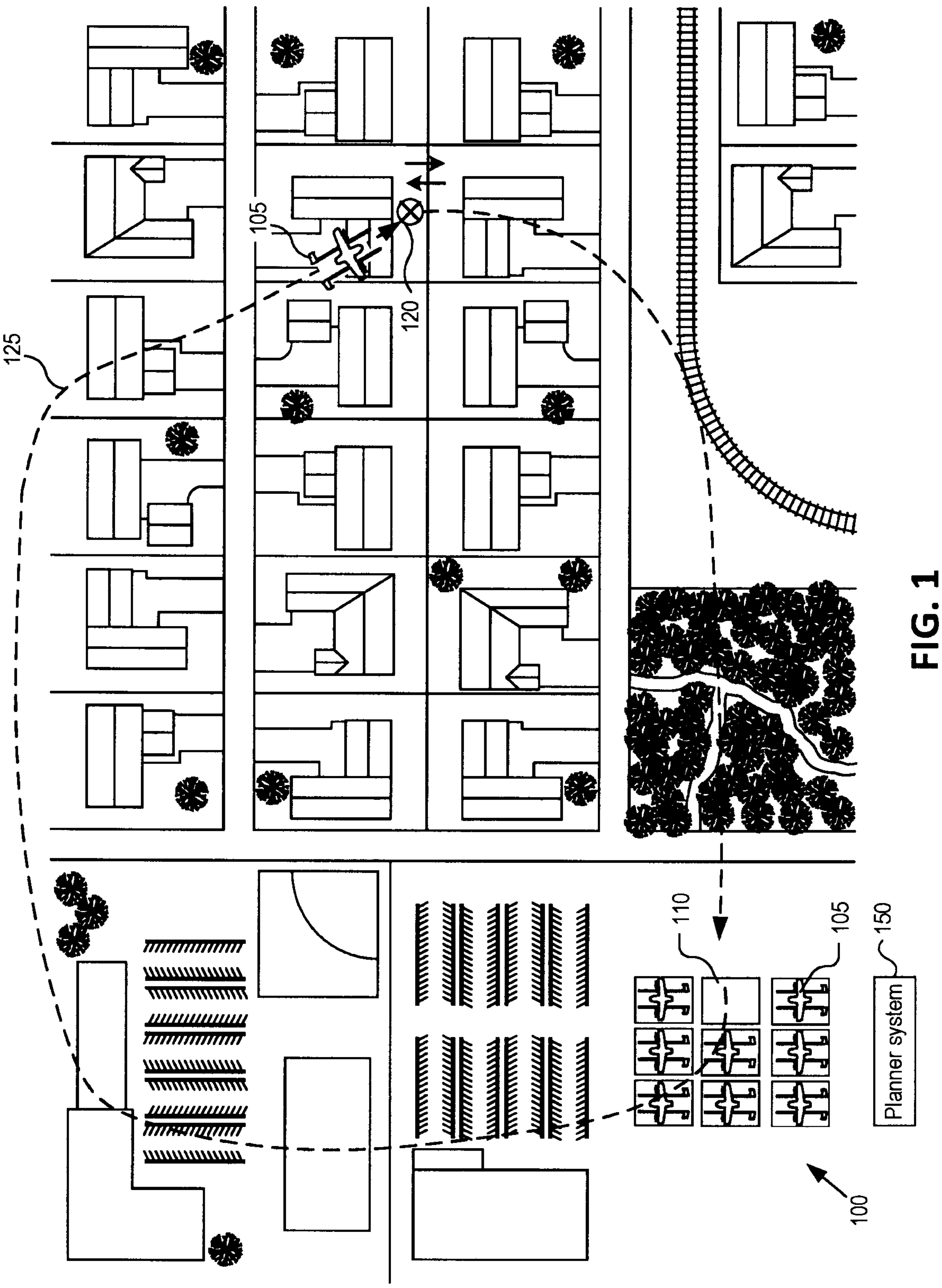
FIG. 1 illustrates a terminal area from which unmanned aerial vehicles (UAVs) are staged on a plurality of staging pads for performing UAV missions over a neighborhood and a calculated route for the UAV, in accordance with an embodiment of the disclosure.

Embodiments of a system, apparatus, and method for automated nest and pad deployment evaluation are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Effective flight planning for UAVs takes into account the planned altitude of the flight and the elevation of the terrain over which the flight will take place. An acceptable flight plan has no segments whose altitude is either too high or too low relative to the terrain, to avoid collisions with fixed obstacles (trees, buildings, etc.) on the low side or interference with commercial slights or other manned flights on the high side. As noted above, one straightforward way to check the planned altitude against the terrain is to query all the terrain heights in the area corresponding to each flight segment and compare those with the planned flight altitude in the area. However, this process is inefficient and resource intensive.

Terrain data is often represented in hierarchical cells, such as S2 cells in the S2 Geometry Library, available from Google LLC. Such cells are typically aligned to a grid pattern, with individual cells being subdivided to allow for the flexibility of inspecting cells at coarser or finer resolutions. On the other hand, flight segments are typically not aligned to a grid pattern. In described embodiments, flight segments are represented in a two-dimensional (2D) plane as polygons, and many such polygons, such as those corresponding to cruise segments, are long and skinny. This means that determining specific terrain elevation values that correspond to the flight segments often requires inspection of many cells and sub-cells at fine levels of resolution, requiring large amounts of computation and data movement.

Embodiments described herein take advantage of insights into this problem. One insight is that UAV missions, such as package deliveries, often take place in areas where people live, which tend to be flatter areas with relatively small variations in terrain heights. Another insight is that for effective flight planning, it is typically not necessary to determine the specific heights of the terrain in all parts of a flight segment. Instead, it is sufficient to confirm that the range of values of the terrain height lies within an acceptable range, which may be based on the planned flight altitude.

In some embodiments, a planned travel segment of a vehicle is validated according to a method in which a computer system including one or more computing devices obtains a raster cell of terrain data from a database, a query shape corresponding to a planned travel segment that intersects with the raster cell, and a range of acceptable terrain elevation values for the planned travel segment. The computer system determines whether the minimum and maximum terrain elevation values of the raster cell are within the range of acceptable terrain elevation values for the planned travel segment and validates the planned travel segment with respect to the raster cell based at least in part on whether the minimum and maximum terrain elevation values of the raster cell are within the range of acceptable terrain elevation values. For example, a planned flight segment of a UAV is validated according to a method in which a computer system including one or more computing devices obtains a raster cell of terrain data from a database, a query shape corresponding to a planned flight segment of a UAV that intersects with the raster cell, and a range of acceptable terrain elevation values for the planned flight segment. The raster cell comprises terrain elevation values including a minimum terrain elevation value and a maximum terrain elevation value, and links to sub-cells of the raster cell. The computer system determines whether the minimum and maximum terrain elevation values of the raster cell are within the range of acceptable terrain elevation values for the planned flight segment and validates the planned flight segment with respect to the raster cell based at least in part on whether the minimum and maximum terrain elevation values of the raster cell are within the range of acceptable terrain elevation values for the planned flight segment.

In some embodiments, validating the planned flight segment comprises, in a case where both the minimum and maximum terrain elevation values of the raster cell are within the range of acceptable terrain elevation values for the planned flight segment, approving the planned flight segment with respect to the raster cell. In some embodiments, validating the planned flight segment comprises, in a case where both the minimum and maximum terrain elevation values of the raster cell are violating the same limit (e.g., both the minimum and maximum terrain elevation values are above the upper bound of the range of acceptable terrain elevation values or below the lower bound of the range of acceptable terrain elevation values for the planned flight segment), disapproving the planned flight segment with respect to the raster cell.

In some embodiments, the range of acceptable terrain elevation values for the planned flight segment is based at least in part on an altitude of the planned flight segment. For example, the range of acceptable terrain elevation values may include an upper bound of the acceptable range that is below the minimum altitude of the planned flight segment. The upper bound of the acceptable range may be separated from the minimum altitude of the flight segment by a safety buffer of, e.g., 50 m, 100 m, or some other distance that takes into account variables such as navigational uncertainty, errors in terrain elevation data, and the like. The upper bound of the acceptable range may be further limited to remain below the altitude of commercial flights or other manned flights. The lower bound of the acceptable range may include a lower bound set at sea level or some other level below the minimum altitude of the planned flight segment. Alternatively, only the upper bound may be specified, with the acceptable range of elevation values being any elevation value below the upper bound.

In some embodiments, validating the planned flight segment comprises, in a case where some but not all of the terrain elevation values of the raster cell are outside the range of acceptable elevation values, determining that at least one of the sub-cells intersects with the query shape, obtaining minimum and maximum terrain elevation values for the sub-cell(s), determining whether the minimum and maximum terrain elevation values of the sub-cell(s) are within the range of acceptable terrain elevation values for the planned flight segment, and validating the planned flight segment with respect to the sub-cell(s) based at least in part on whether the minimum and maximum terrain elevation values of the sub-cell(s) are within the range of acceptable terrain elevation values for the planned flight segment. In some embodiments, further processing of a sub-cell can be skipped, and the planned flight segment can be approved with respect to that sub-cell, if the sub-cell does not intersect with the query shape.

In some embodiments, the query shape comprises a planform of a 3D volume corresponding to the planned flight segment (e.g., a polygon corresponding to the planned flight segment as viewed from above). The planned flight segment may be, e.g., a cruise segment, an ascent segment, a descent segment, or a hovering segment.

In some embodiments, the UAV is configured to fly a mission that includes the planned flight segment, such as by programming the UAV directly to fly along a flight path that includes the planned flight segment or by communicating wirelessly with the UAV to instruct the UAV to fly along a flight path that includes the planned flight segment.

Illustrative details of such techniques are described below.

In general, UAVs may be provisioned to perform a variety of different mission types, including package delivery, aerial photography, public safety, etc. These UAVs may stage from an operations facility where many UAVs operate. FIG. 1 illustrates an example terminal area (or "nest") 100 staging a plurality of UAVs, such as UAV 105, for servicing a nearby neighborhood. In the example shown in FIG. 1, nest 100 includes staging pads 110 such as launching pads, landing pads, charging pads, or any combination thereof.

In an illustrative delivery scenario, workers attach a package to UAV 105 on a staging pad 110. UAV 105 is given an order regarding where the delivery will be made (e.g., delivery zone 120). A software system (e.g., a back-end planner system 150) calculates the route 125 based on a mission request (e.g., a specification of a delivery to be made to a customer). In some embodiments, the route 125 is composed of interconnected planned flight segments (described in further detail herein) which take the form of 3D volumes within which the UAV 105 is expected to fly while navigating the route 125. In some embodiments, these 3D volumes act as partially overlapping airspace reservation volumes with a minimum and maximum altitude, with each volume being active for the limited time period in which the UAV is expected to occupy it during its planned flight. Once the route 125 is successfully planned and approved, the UAV 105 takes off and makes the delivery according to the calculated route. Alternatively, an on-board software system may operate in combination with a back-end system, or independently, to calculate the route 125. Multiple delivery missions may be occurring at a given time, with other UAVs taking off from and landing on other staging pads 110 within nest 100.

Figure 2A:
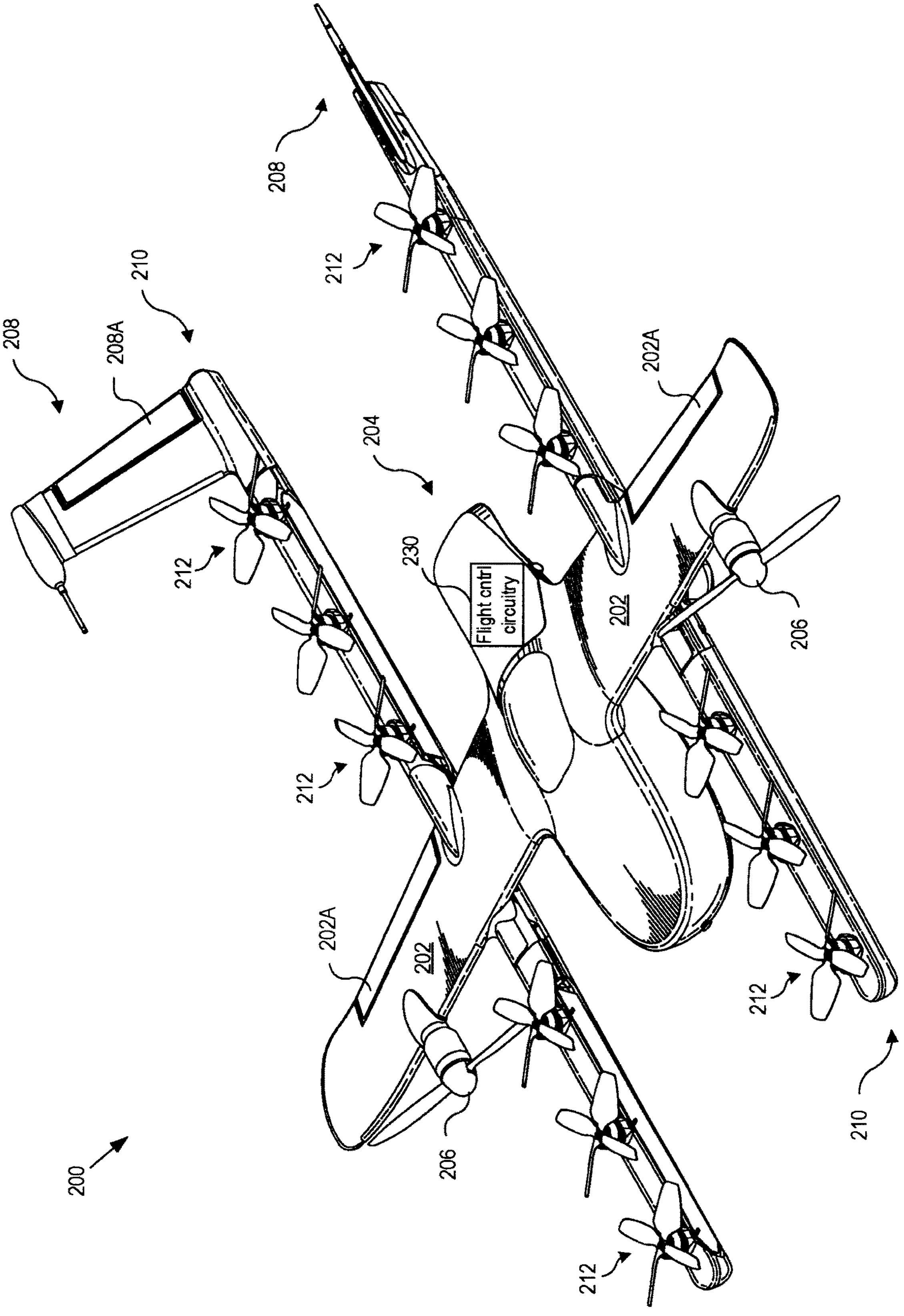
FIGS. 2A and 2B illustrate an example UAV, in accordance with an embodiment of the disclosure.
Figure 2B:
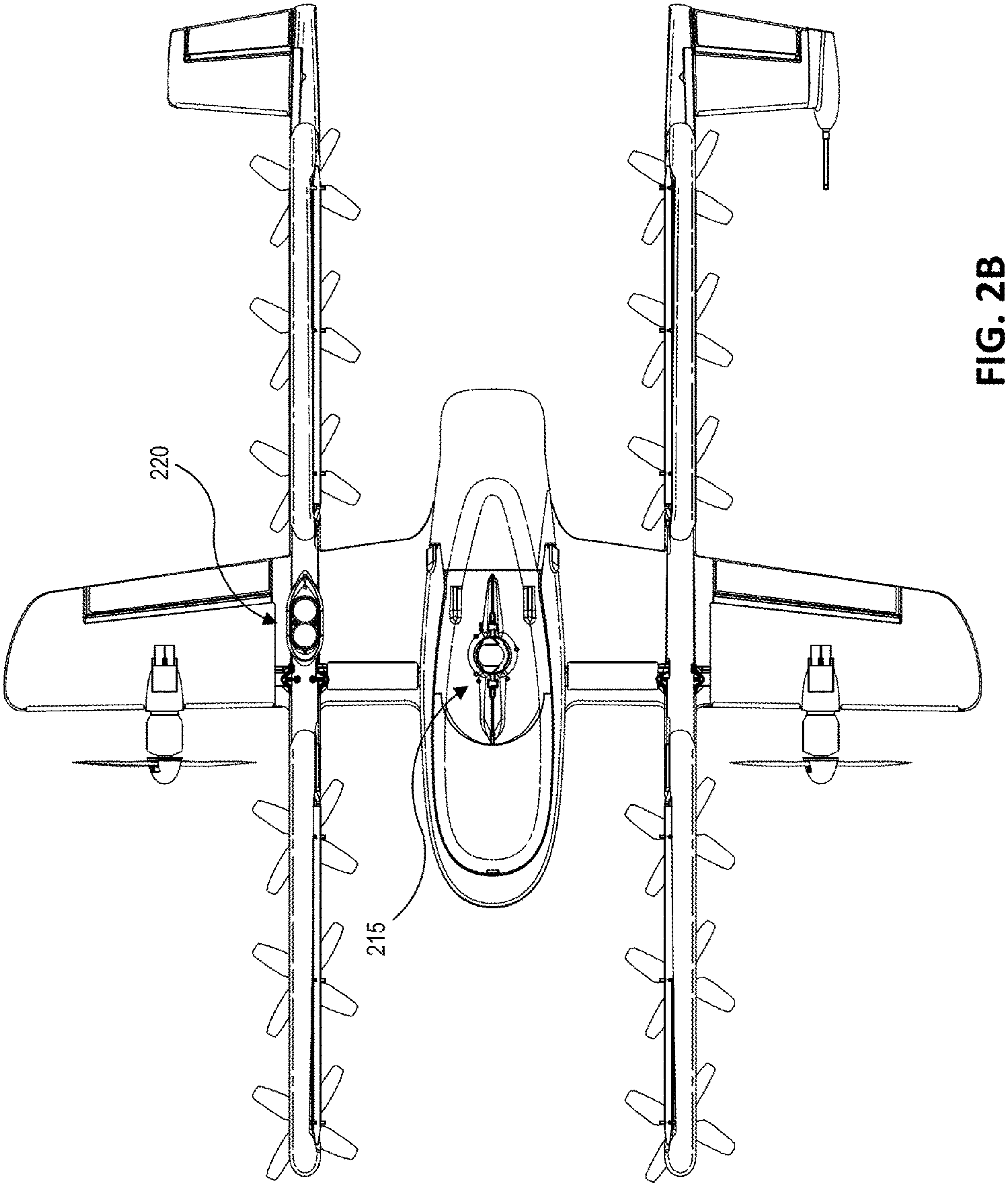

FIGS. 2A and 2B illustrate features of an illustrative UAV, in accordance with embodiments described herein.

FIGS. 2A and 2B illustrate a UAV 200 that is well suited for various types of UAV missions including package delivery, aerial photography, public safety, or otherwise, in accordance with embodiments described herein.

FIG. 2A is a topside perspective view illustration of UAV 200 while FIG. 2B is a bottom side plan view illustration of the same. UAV 200 is one possible implementation of UAV 105 illustrated in FIG. 1, although other types of UAVs may be implemented as well.

The illustrated embodiment of UAV 200 is a vertical takeoff and landing (VTOL) UAV that includes separate propulsion units 206 and 212 for providing horizontal and vertical propulsion, respectively. UAV 200 is a fixed-wing aerial vehicle, which as the name implies, has a wing assembly 202 that can generate lift based on the wing shape and the vehicle's forward airspeed when propelled horizontally by propulsion units 206. The illustrated embodiment of UAV 200 has an airframe that includes a fuselage 204 and wing assembly 202. In one embodiment, fuselage 204 is modular and includes a battery module, an avionics module, and a mission payload module. These modules are secured together to form the fuselage or main body.

The battery module (e.g., fore portion of fuselage 204) includes a cavity for housing one or more batteries for powering UAV 200. The avionics module (e.g., aft portion of fuselage 204) houses flight control circuitry 230 of UAV 200, which may include a processor and memory, communication electronics and antennas (e.g., cellular transceiver, Wi-Fi transceiver, etc.), and various sensors (e.g., global positioning sensor, an inertial measurement unit, a magnetic compass, a radio frequency identifier reader, etc.). The mission payload module (e.g., middle portion of fuselage 204) houses equipment associated with a mission of UAV 200. For example, the mission payload module may include a payload actuator 215 (see FIG. 2B) for holding and releasing an externally attached payload (e.g., package for delivery). In some embodiments, the mission payload module may include camera/sensor equipment (e.g., camera, lenses, radar, lidar, pollution monitoring sensors, weather monitoring sensors, scanners, etc.). In FIG. 2B, an onboard camera 220 is mounted to the underside of UAV 200 to support a computer vision system for visual triangulation, visual odometry, geofiducial navigation as well as operate as an optical code scanner for reading visual codes affixed to packages.

As illustrated, UAV 200 includes horizontal propulsion units 206 positioned on wing assembly 202 for propelling UAV 200 horizontally. UAV 200 further includes two boom assemblies 210 that secure to wing assembly 202. Vertical propulsion units 212 are mounted to boom assemblies 210. Vertical propulsion units 212 provide vertical propulsion. Vertical propulsion units 212 may be used during a hover mode where UAV 200 is descending (e.g., to a delivery location), ascending (e.g., at initial launch or following a delivery), or maintaining a constant altitude. Stabilizers 208 (or tails) may be included with UAV 200 to control pitch and stabilize the aerial vehicle's yaw (left or right turns) during cruise. In some embodiments, during cruise mode vertical propulsion units 212 are disabled or powered low and during hover mode horizontal propulsion units 206 are disabled or powered low.

During flight, UAV 200 may control the direction and/or speed of its movement by controlling its pitch, roll, yaw, and/or altitude. Thrust from horizontal propulsion units 206 is used to control air speed. For example, the stabilizers 208 may include one or more rudders 208*a* for controlling the aerial vehicle's yaw, and wing assembly 202 may include elevators for controlling the aerial vehicle's pitch and/or ailerons 202*a* for controlling the aerial vehicle's roll. As another example, increasing or decreasing the speed of all the propeller blades simultaneously can result in UAV 200 increasing or decreasing its altitude, respectively.

Many variations on the illustrated fixed-wing aerial vehicle are possible. For instance, aerial vehicles with more wings (e.g., an "x-wing" configuration with four wings), are also possible. Although FIGS. 2A and 2B illustrate one wing assembly 202, two boom assemblies 210, two horizontal propulsion units 206, and six vertical propulsion units 212 per boom assembly 210, it should be appreciated that other variants of UAV 200 may be implemented with more or less of these components.

As explained above, in some embodiments, a planned route of a UAV (e.g., UAV 200) is composed of flight segments in the form of 3D volumes within which the UAV is expected to fly while navigating the route. In some embodiments, the process of planning a route includes validating individual flight segments.

Figure 3:
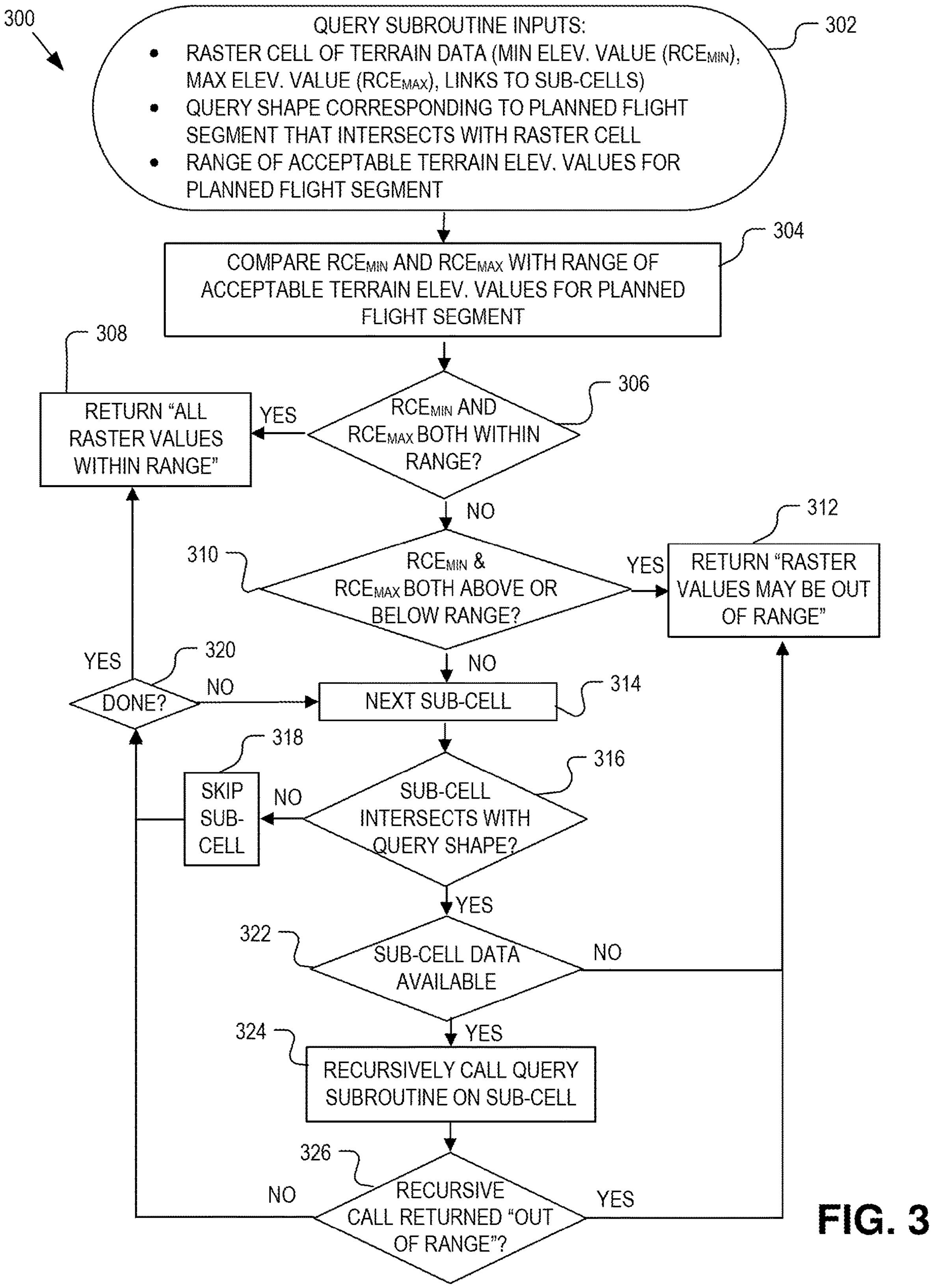
FIG. 3 illustrates a query process that may be used to validate a planned flight segment with respect to a raster cell of terrain data based at least in part on whether minimum and maximum terrain elevation values of the raster cell are within a range of acceptable terrain elevation values for the planned flight segment, in accordance with an embodiment of the disclosure.

FIG. 3 illustrates a process 300 for a cell query subroutine to determine whether a planned flight segment should be validated for a particular raster cell, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

Process 300 uses multi-resolution raster data. In an embodiment, S2 cells are used, but other implementations of hierarchical cells are possible as well. For example, a latitude-longitude (or "lat-long") raster may be used, with the top level being the whole world or a section thereof, and each subdivision splitting in half either along a meridian or latitude line, alternating at each level to keep the subdivided regions generally square.

In an illustrative scenario, the coarsest level of the raster is a single quadrilateral which is subdivided into finer levels, with each cell and sub-cell having an associated minimum terrain elevation value, maximum terrain elevation value, boundaries of the cell (either implicit or explicitly coded in the cell), and an indication of whether any further subdivisions of the cell are present, with links to those subdivisions if they exist.

Process 300 commences by a computer system obtaining the inputs of the query subroutine (process block 302), which includes the raster cell data, a query shape corresponding to a planned flight segment that intersects with the raster cell, and a range of acceptable terrain elevation values for the planned flight segment. The raster cell includes a minimum elevation value ($RCE_{MIN}$), a maximum elevation value ($RCE_{MAX}$), and links to sub-cells of the raster cell. Once these inputs are obtained, process 300 continues with further steps that can be used to validate the planned flight segment with respect to the current cell based on these inputs. In the example shown in FIG. 3, process 300 returns a value (e.g., a Boolean value) indicating whether all elevation values in the raster cell are within the range of acceptable values. This value is represented in FIG. 3, for purposes of illustration, as either "All raster values within range" or "Raster values may be out of range." In an illustrative scenario, the planned flight segment is approved with respect to the current raster cell if process 300 returns "All raster values within range" and disapproved if process 300 returns "Raster values may be out of range." A disapproved flight segment can be recalculated and incorporated in a modified route.

As shown in FIG. 3, once the inputs are obtained, process 300 continues by comparing $RCE_{MIN}$ and $RCE_{MAX}$ with the range of acceptable terrain elevation values (process block 304). If $RCE_{MIN}$ and $RCE_{MAX}$ are both within the range of acceptable terrain values (decision block 306), process 300 returns "All raster values within range" without processing any sub-cells (process block 308), and the query subroutine ends.

Figure 4A:
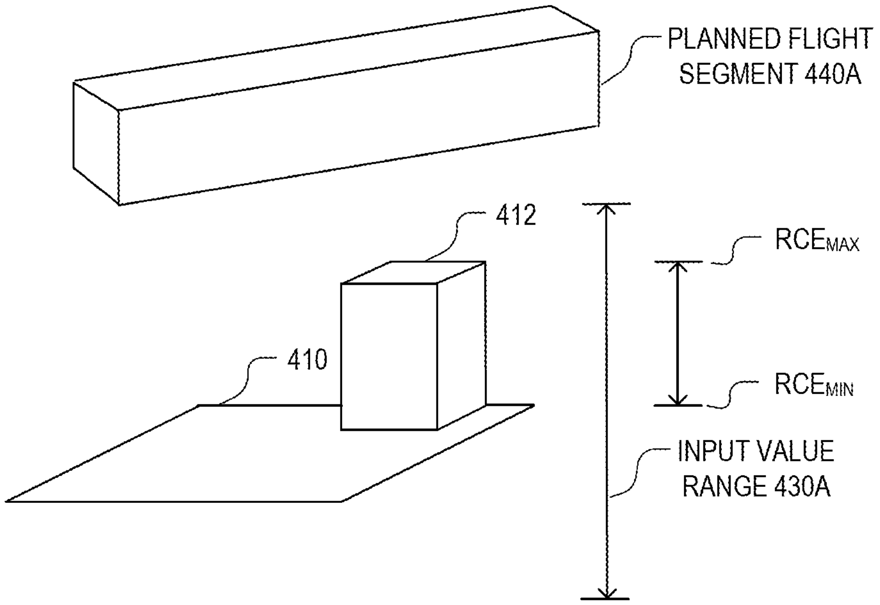
FIGS. 4A-4C are illustrations of scenarios for comparing minimum and maximum terrain elevation values of a raster cell with a range of acceptable terrain elevation values for a planned flight segment, in accordance with an embodiment of the disclosure.

FIG. 4A is an illustration of a scenario in which $RCE_{MIN}$ and $RCE_{MAX}$ are both within the range of acceptable terrain values. A planned flight segment 440A is depicted as a 3D volume that intersects (on the X-Y plane) with raster cell 410A. The terrain corresponding to raster cell 410 is generally flat but also includes a building 412. $RCE_{MAX}$ corresponds to the top of building 412. Input value range 430A indicates the range of acceptable terrain elevation values which, in this example, is below planned flight segment 440A. In an illustrative scenario, because $RCE_{MIN}$ and $RCE_{MAX}$ are both within range 430A, planned flight segment 440A can be approved with respect to the elevation values of raster cell 410.

Returning to FIG. 3, if $RCE_{MIN}$ and $RCE_{MAX}$ are not both within the range of acceptable terrain values, process 300 continues by checking whether $RCE_{MIN}$ and $RCE_{MAX}$ are both above or both below the range of acceptable terrain values (decision block 310). If $RCE_{MIN}$ and $RCE_{MAX}$ are both above or both below the range of acceptable terrain values, process 300 returns "Raster values may be out of range" without processing any sub-cells (process block 312), and the query subroutine ends. In this way, the system can quickly move on to processing of other raster cells without processing any sub-cells if the results in decision blocks 306 and 310 indicate that no further processing is necessary, which conserves computing resources and improves efficiency.

Figure 4B:
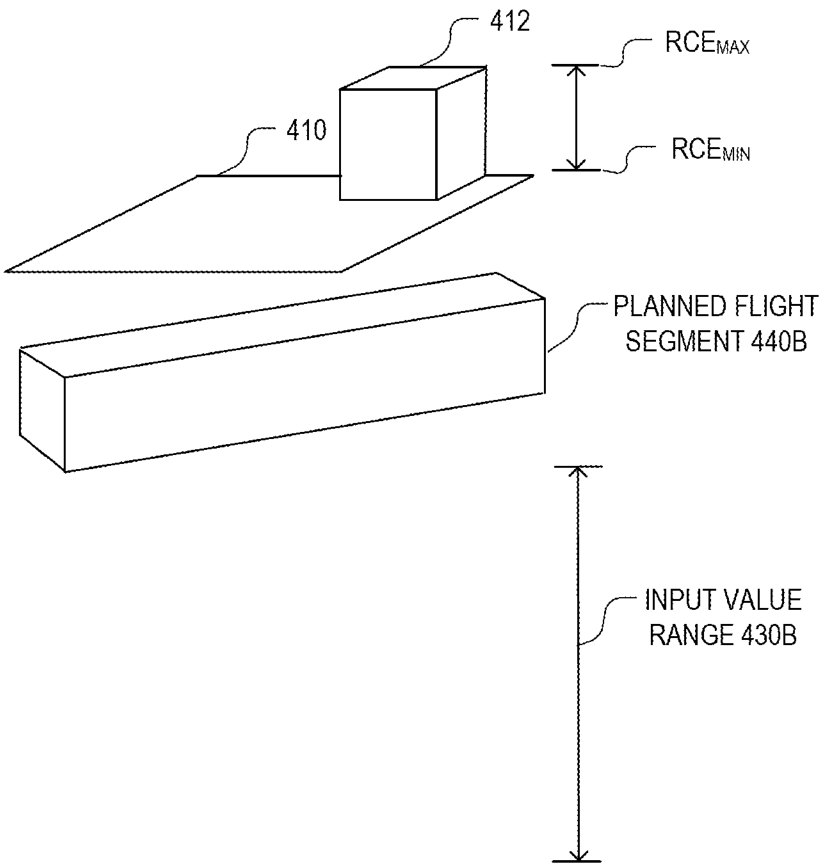

FIG. 4B is an illustration of a scenario in which $RCE_{MIN}$ and $RCE_{MAX}$ are both above the range of acceptable terrain values. A planned flight segment 440B is depicted as 3D volume that intersects (on the X-Y plane) with raster cell 410. Input value range 430B indicates the range of acceptable terrain elevation values, which is below planned flight segment 440B. In this situation, planned flight segment 440B is below the terrain corresponding to raster cell 410. Therefore, $RCE_{MIN}$ and $RCE_{MAX}$ are both below range 430B, and planned flight segment 440B is disapproved with respect to raster cell 410.

Returning to FIG. 3, if the conditions that were tested for in decision blocks 306 and 310 are not present, then some, but not all, of the terrain elevation values of the raster cell are outside the range of acceptable elevation values. Thus, the range of terrain elevation values of the raster cell overlaps the range of acceptable elevation values but is partially outside of it. In one illustrative scenario, one, but not both, of $RCE_{MIN}$ and $RCE_{MAX}$ is within the range of acceptable terrain values. In another illustrative scenario, $RCE_{MIN}$ is below the range of acceptable terrain values and $RCE_{MAX}$ is above the range of acceptable terrain values, but other terrain elevation values of the raster cell are within the range of acceptable terrain values. In either of these scenarios, more processing is needed to determine whether the planned flight segment can be approved, and process 300 enters process block 314 to process sub-cells of the current raster cell.

Figure 4C:
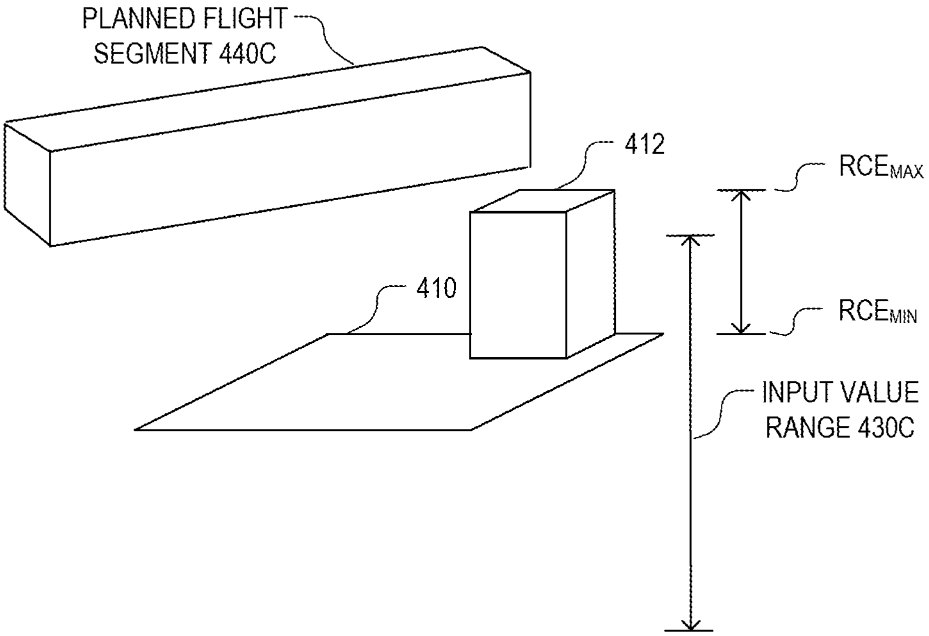

FIG. 4C is an illustration of a scenario in which $RCE_{MAX}$ is outside the range of acceptable terrain values, and $RCE_{MIN}$ is within this range. Planned flight segment 440C is depicted as 3D volume that intersects (on the X-Y plane) with raster cell 410. The lower portion of planned flight segment 440C is lower than the top of building 412. Therefore, $RCE_{MAX}$ is outside input value range 430C, but $RCE_{MIN}$ is within this range. In practical terms, planned flight segment 440C may still be approved with respect to raster cell 410 if it does not intersect with the building 412. In order to determine whether planned flight segment 440C can be approved with respect to raster cell 410, further processing is performed on sub-cells of raster cell 410.

Referring again to FIG. 3, the system determines whether the current sub-cell intersects with the query shape (decision block 316). If the sub-cell does not intersect with the query shape, the system skips processing of this sub-cell (process block 318). In this way, even though the current sub-cell may have a land feature or obstacle with an elevation at or above the planned flight segment, the system can take advantage of the fact that the planned flight segment does not enter the current sub-cell and, therefore, any such features or obstacles in the current sub-cell do not pose a risk of collision. The system can quickly move on to processing of other sub-cells without determining specific elevation values for the current sub-cell, which conserves computing resources and improves efficiency. Process 300 continues by determining whether each sub-cell has been checked (decision block 320). If any sub-cells remain, the system processes the next sub-cell (decision block 314).

Returning to decision block 316, if the sub-cell intersects with the query shape, process 300 continues by checking whether elevation data is available for this sub-cell (decision block 322). If no elevation data is available, it is not safe to confirm the planned flight segment, and the process returns "Raster values may be out of range" (process block 312). If elevation data is available, process 300 continues by recursively calling the query subroutine on this sub-cell (process block 324), which may involve processing of one or more finer levels of sub-cells, if present.

Figure 5:
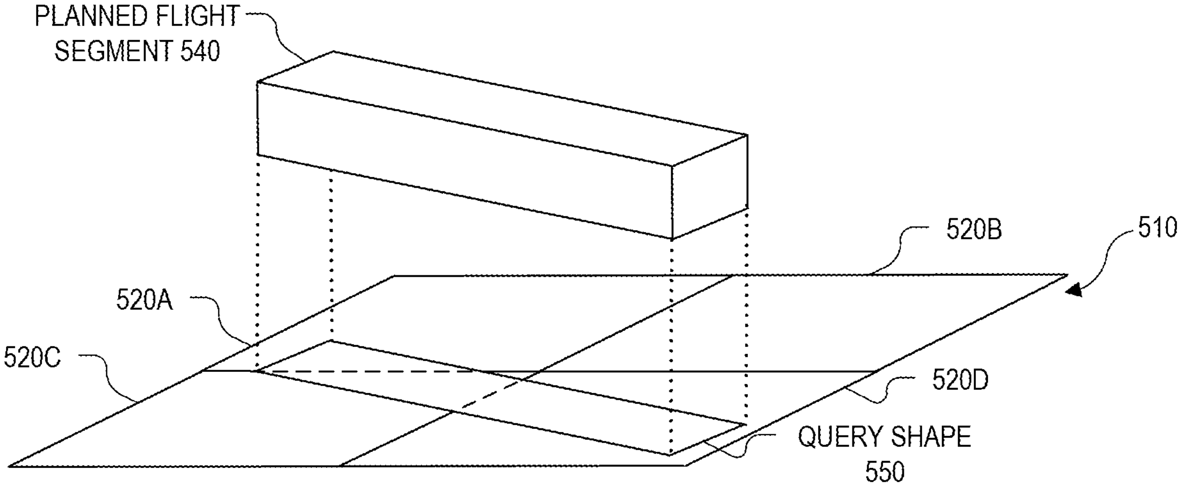
FIG. 5 is an illustration of a scenario in which a query shape intersects some but not all sub-cells of a raster cell, in accordance with an embodiment of the disclosure.

FIG. 5 is an illustration of a scenario in which a query shape intersects some but not all sub-cells of a raster cell. In the example shown in FIG. 5, the system determines whether sub-cell 520A of raster cell 510 intersects with query shape 550 (see decision block 316), which corresponds to a planned flight segment 540. Query shape 550 is a polygon corresponding to the planned flight segment 540 as viewed from above. In this example, query shape 550 is a quadrilateral corresponding to a cruise segment that does not align to the grid of the raster, but instead overlays the grid diagonally and crosses boundaries of multiple sub-cells (represented by dashed lines within query shape 550) at the illustrated level of resolution. Alternatively, other query shapes can be used, such as an octagon, dodecagon, etc., corresponding to an ascent, descent, or hovering segment, or an irregular polygon having a convex portion that approximates a curved flight segment. Sub-cell 520A intersects with query shape 550, and the system recursively calls the query subroutine on this sub-cell (see process block 324). Once the processing of sub-cell 520A is complete, the system proceeds to sub-cell 520B. In this case, sub-cell 520B does not intersect with query shape 550, so sub-cell 520B is skipped. The system proceeds to process, in turn, sub-cell 520C and sub-cell 520D, and recursively calls the query subroutine on these sub-cells.

Returning to FIG. 3, if the recursive call returned "Raster values may be out of range" for the current sub-cell (decision block 326), then process 300 returns "Raster values may be out of range" for the current raster cell (process block 312), and the process ends for the current raster cell (no further processing of the sub-cells is needed). Otherwise, the recursive call returns "All raster values within range" for the current sub-cell, and process 300 continues by determining whether each sub-cell has been checked (decision block 320). If any sub-cells remain, the system processes the next sub-cell (decision block 314). Otherwise, all sub-cells have been skipped or confirmed as being within the acceptable range, process 300 returns "All raster values within range" for the current raster cell, and the process ends for the current raster cell.

Process 300 performs well in many UAV mission use cases, such as delivery of packages to users in areas without large elevation ranges (e.g., flatter areas rather than mountain, cliff, or canyon areas), where the raster-sampled function has a small range of values of the region of the query shape. Many raster cell queries can be answered without inspecting fine-resolution sub-cells. By limiting the query to whether elevation values are in an acceptable range, rather than determining what the exact range of elevation values is, process 300 can often stop at a coarse level of detail without expending computational resources on finer levels of detail.

The raster data on which queries can be made may be very large. To illustrate, if the Earth's surface is estimated to be $5.1*10^{14}$ $m^2$, a 10 m horizontal resolution corresponds to $5.1*10^{12}$ cells. Storing just a single 4-byte elevation value for each cell would require 24 TB of storage. To allow full-resolution queries over such large datasets, computation can be distributed to separate computers, with individual computers or groups of computers being responsible for a localized region and holding the data for that region. Queries can be sent to the computer or computers responsible for the regions intersecting the query shape. To account for situations where some regions have a higher density of queries than others (e.g., cities vs. unpopulated areas), frequently queried regions can have multiple computers assigned to respond to queries. Lower-frequency regions may be assigned only one computer, or even none, with queries in in lower-frequency regions being served by loading data from disk on an as-needed basis. The geographic extent and resolution of the data in memory also can be adjusted, e.g., to limit the amount of data that is being used to answer most queries locally with information in memory.

Many alternatives to the processes described above are possible, and some alternatives may provide for further efficiency gains in some circumstances. As an example, a further check could be added to determine whether a cell is completely contained within a query shape before processing any finer-resolution sub-cells. In this situation, the cell does not need to be recursively subdivided, because all sub-cells would also be contained within the cell and intersect with the cell. Therefore, it is not necessary to determine whether sub-cells within the cell intersect with the query shape (see process block 316) in this situation. For example, in a case where some of the terrain elevation values of the raster cell are outside the range of acceptable terrain elevation values for the planned flight segment, but the terrain elevation values are only partially outside the acceptable range and the raster cell is completely contained within the query shape, the planned flight segment can be disapproved with respect to the raster cell without checking any sub-cells. As another alternative, the validating step may be performed separately against the acceptable range maximum and acceptable range minimum, and the planned flight segment may be accepted as a whole only if accepted against both the minimum and maximum limits. In such an embodiment, the range of acceptable terrain elevation values may include a minimum acceptable terrain elevation value and a maximum acceptable terrain elevation value, and the validating step may include approving the planned flight segment with respect to the raster cell only if the minimum and maximum terrain elevation values of the raster cell are both above the minimum acceptable terrain elevation value and below the maximum acceptable terrain elevation value.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

For example, although embodiments described herein relate to UAVs and terrain heights, such embodiments can be modified to account for other use cases, such as validating planned travel segments for vehicles other than UAVs. For example, described embodiments can be modified to determine whether a submarine may safely travel at a planned depth without risk of colliding with a seamount or other features of the seafloor. As another example, described embodiments can be adapted for vehicles, such as aircraft, that may operate in fully autonomous modes in some situations and human-piloted modes in other situations. In general, described embodiments can be extended to situations with a continuous scalar function that has been sampled on a regular grid, or resampled to a regular grid (e.g., by kriging) and a query shape, such as a circle or polygon that is not necessarily aligned to the function's sample grid. In such situations, a query can be made to determine whether all values of the function within the query shape lie within a given range. Such use cases can be further generalized to higher dimensions, such as where the function produces values within a 3D space, and the query shape is a 3D volume such as a sphere or polyhedron.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of validating a planned flight segment of an unmanned aerial vehicle (UAV) performed by a computer system including one or more computing devices, the method comprising:

obtaining a raster cell of terrain data from a database, the raster cell comprising terrain elevation values including a minimum terrain elevation value and a maximum terrain elevation value, and links to sub-cells of the raster cell;

obtaining a query shape corresponding to a planned flight segment of a UAV that intersects with the raster cell;

obtaining a range of acceptable terrain elevation values for the planned flight segment;

determining whether the minimum and maximum terrain elevation values of the raster cell are within the range of acceptable terrain elevation values for the planned flight segment;

validating the planned flight segment with respect to the raster cell based at least in part on whether the minimum and maximum terrain elevation values of the raster cell are within the range of acceptable terrain elevation values for the planned flight segment;

approving the planned flight segment with respect to the raster cell; and the UAV flying a mission, wherein the mission includes the planned flight segment.

2. The method of claim 1, wherein the the planned flight segment is approved with respect to the raster cell in a case where both the minimum and maximum terrain elevation values of the raster cell are within the range of acceptable terrain elevation values for the planned flight segment.

3. The method of claim 1, wherein the validating step comprises:

in a case where some, but not all, of the terrain elevation values of the raster cell are outside the range of acceptable elevation values:

determining that at least one of the sub-cells intersects with the query shape;

obtaining minimum and maximum terrain elevation values for the at least one sub-cell;

determining whether the minimum and maximum terrain elevation values of the at least one sub-cell are within the range of acceptable terrain elevation values for the planned flight segment; and validating the planned flight segment with respect to the at least one sub-cell based at least in part on whether the minimum and maximum terrain elevation values of the at least one sub-cell are within the range of acceptable terrain elevation values for the planned flight segment.

4. The method of claim 3, wherein the validating step further comprises:

approving the planned flight segment with respect to a sub-cell of the raster cell that does not intersect with the query shape.

5. The method of claim 1, wherein the validating step comprises:

in a case where both the minimum and maximum terrain elevation values of the raster cell are above the range of acceptable terrain elevation values for the planned flight segment or both the minimum and maximum terrain elevation values of the raster cell are below the range of acceptable terrain elevation values for the planned flight segment, disapproving the planned flight segment with respect to the raster cell.

6. The method of claim 1, wherein the validating step comprises:

in a case where some of the terrain elevation values of the raster cell are outside the range of acceptable terrain elevation values for the planned flight segment and the raster cell is completely contained within the query shape, disapproving the planned flight segment with respect to the raster cell.

7. The method of claim 1, wherein the range of acceptable terrain elevation values includes a minimum acceptable terrain elevation value and a maximum acceptable terrain elevation value, and wherein the validating step comprises:

approving the planned flight segment with respect to the raster cell only if the minimum and maximum terrain elevation values of the raster cell are both above the minimum acceptable terrain elevation value and below the maximum acceptable terrain elevation value.

8. The method of claim 1, wherein the range of acceptable terrain elevation values for the planned flight segment is based at least in part on an altitude of the planned flight segment.

9. The method of claim 1, wherein the query shape comprises a planform of a 3D volume corresponding to the planned flight segment, and wherein the planned flight segment comprises a cruise segment, an ascending segment, a descending segment, or a hovering segment.

10. The method of claim 1 further comprising configuring the UAV to fly a mission that includes the planned flight segment.

11. At least one non-transitory machine-readable storage medium that provides instructions that, when executed by a computer system comprising one or more computing devices, will cause the computer system to perform operations comprising:

obtaining a raster cell of terrain data from a database, the raster cell comprising terrain elevation values including a minimum terrain elevation value and a maximum terrain elevation value, wherein the raster cell includes a plurality of sub-cells;

obtaining a query shape corresponding to a planned flight segment of an unmanned aerial vehicle (UAV) that intersects with the raster cell;

obtaining a range of acceptable terrain elevation values for the planned flight segment;

determining whether the minimum and maximum terrain elevation values of the raster cell are within the range of acceptable terrain elevation values for the planned flight segment;

validating the planned flight segment with respect to the raster cell based at least in part on whether the minimum and maximum terrain elevation values of the raster cell are within the range of acceptable terrain elevation values for the planned flight segment;

approving the planned flight segment with respect to the raster cell; and the UAV flying a mission, wherein the mission includes the planned flight segment.

12. The non-transitory machine-readable storage medium of claim 11, wherein the the planned flight segment is approved with respect to the raster cell in a case where both the minimum and maximum terrain elevation values of the raster cell are within the range of acceptable terrain elevation values for the planned flight segment.

13. The non-transitory machine-readable storage medium of claim 11, wherein the validating step comprises:

in a case where some, but not all, of the terrain elevation values of the raster cell are outside the range of acceptable elevation values:

determining that at least one of the sub-cells intersects with the query shape;

obtaining minimum and maximum terrain elevation values for the at least one sub-cell;

determining whether the minimum and maximum terrain elevation values of the at least one sub-cell are within the range of acceptable terrain elevation values for the planned flight segment; and validating the planned flight segment with respect to the at least one sub-cell based at least in part on whether the minimum and maximum terrain elevation values of the at least one sub-cell are within the range of acceptable terrain elevation values for the planned flight segment.

14. The non-transitory machine-readable storage medium of claim 13, wherein the validating step further comprises:

approving the planned flight segment with respect to a sub-cell of the raster cell that does not intersect with the query shape.

15. The non-transitory machine-readable storage medium of claim 11, wherein the validating step comprises:

in a case where both the minimum and maximum terrain elevation values of the raster cell are above the range of acceptable terrain elevation values for the planned flight segment or both the minimum and maximum terrain elevation values of the raster cell are below the range of acceptable terrain elevation values for the planned flight segment, disapproving the planned flight segment with respect to the raster cell.

16. The non-transitory machine-readable storage medium of claim 11, wherein the validating step comprises:

in a case where some of the terrain elevation values of the raster cell are outside the range of acceptable terrain elevation values for the planned flight segment and the raster cell is completely contained within the query shape, disapproving the planned flight segment with respect to the raster cell.

17. The non-transitory machine-readable storage medium of claim 11, wherein the range of acceptable terrain elevation values includes a minimum acceptable terrain elevation value and a maximum acceptable terrain elevation value, and wherein the validating step comprises:

approving the planned flight segment with respect to the raster cell only if the minimum and maximum terrain elevation values of the raster cell are both above the minimum acceptable terrain elevation value and below the maximum acceptable terrain elevation value.

18. The non-transitory machine-readable storage medium of claim 11, wherein the range of acceptable terrain elevation values for the planned flight segment is based at least in part on an altitude of the planned flight segment.

19. The non-transitory machine-readable storage medium of claim 11, wherein the query shape comprises a planform of a 3D volume corresponding to the planned flight segment, and wherein the planned flight segment comprises a cruise segment, an ascending segment, a descending segment, or a hovering segment.

* * * * *